United States Patent [19]
Forster et al.

[11] 3,821,265

[45] June 28, 1974

[54] PRODUCTION OF CARBOXYLIC ACIDS

[75] Inventors: Denis Forster, University City; Arnold Hershman, St. Louis, both of Mo.

[73] Assignee: Monsanto Company, St. Louis, Mo.

[22] Filed: Nov. 19, 1971

[21] Appl. No.: 200,518

[52] U.S. Cl............... 260/413, 203/6, 252/441, 260/533 AN
[51] Int. Cl............................. C08h 17/36
[58] Field of Search............... 260/413, 533 AN

[56] References Cited
UNITED STATES PATENTS

| | | |
|---|---|---|
| 2,593,440 | 4/1952 | Hagemeyer............ 260/533 AN X |
| 3,349,119 | 10/1967 | Fenton.................... 260/533 AN X |
| 3,381,030 | 4/1968 | Biale et al............... 260/533 AN X |
| 3,579,552 | 5/1971 | Craddock et al.................. 260/413 |

*Primary Examiner*—Elbert L. Roberts
*Assistant Examiner*—Ethel G. Love

[57] ABSTRACT

Production of carboxylic acids by carboxylation of ethylenically unsaturated compounds utilizing a stabilized catalyst system comprising a rhodium or iridium compound, a halide promoter and a molybdenum or chromium compound as a stabilizer component.

16 Claims, No Drawings

PRODUCTION OF CARBOXYLIC ACIDS

This invention relates to an improved process for the preparation of carboxylic acids. More particularly, it relates to improved stabilized catalyst compositions for the reaction of ethylenically unsaturated compounds with carbon monoxide and water to yield carboxylic acids. More specifically, the said improved catalyst compositions are essentially comprised of iridium or rhodium compounds or complexes, halide promoters, and a molybdenum or chromium compound as a catalyst stabilizer component.

Processes for the preparation of carboxylic acids from olefins, and other ethylenically unsaturated compounds, carbon monoxide and water are well known in the art and have been directed to the production of carboxylic acids and ester derivatives. The prior art teaches the use of a number of catalysts for the synthesis of carboxylic acids by reaction of olefins with carbon monoxide and water at elevated temperatures and pressures. Catalysts such as boric, arsenic and monochloroacetic acids; acetyl chloride on active carbon; boron trifluoride; barium and calcium halides; salts and carbonyls of nickel and cobalt, especially halides; and in general, the Group VIII metals, as simple salts, carbonyls and complexes; have been reported to function for the production of carboxylic acids and esters by reaction of olefins and carbon monoxide in the presence of water or other hydroxylic compounds at temperatures from 130°C – 375°C and pressures up to 1,000 atmospheres.

Certain disadvantages present in the carboxylation processes described in the prior art are catalyst instability, lack of product selectivity, and low levels of catalyst reactivity. A serious problem which is prevalent with metal complex catalysts described in the prior art is that while being soluble and stable under the conditions normally present under reaction synthesis conditions, the said catalysts frequently decompose and deposit unreactive, insoluble metal compounds under conditions which exist during processing steps and the subsequent isolation of the desired carboxylic acid products, for example, by distillation, vacuum distillation, vacuum filtration, high temperature crystallization, etc. In addition, these prior art catalyst systems frequently decompose to inactive residues if the conditions in the reactor are upset, for example by carbon monoxide deficiency, resulting from a control failure. Such limitations present in the catalyst systems described in the prior art for production of carboxylic acids result in a short catalyst life and serious problems in recycling the catalyst from the area of the process equipment used for the separation of the product to the area of the process equipment used for the actual synthesis reaction which employes the metal component as the catalyst. These problems lead to costly techniques for recovering these highly expensive metal compounds, and seriously detract from the usefulness of the catalyst systems in processes described in the prior art.

Quite unexpectedly, it has been found that addition of molybdenum or chromium compounds, such as the fluoride, chloride, bromide, iodide, carbonyl, acetate, propionate, dodecanoate, etc. to the halide promoted Group VIII metal compounds results in catalyst systems which are very stable against precipitation or solid decomposition, under a wide variety of operating conditions and, in addition, exhibit high reactivity and long catalyst life.

Most chemical compounds which are added to the present rhodium and iridium catalyst systems are unsuitable as stabilizers because they either interfere with the activity or selectivity of the catalyst. Added compounds may also form derivatives which are volatile under the distillation conditions during the purification stage and are thus lost from the reaction mixture, with the result that the catalyst may separate from the solution as various solid residues, and consequently lose its catalytic activity. It has, however, been found that certain salts and derivatives have the ability to prevent catalyst precipitation during either reaction and/or distillation of the products from the catalyst solution after the reaction has taken place.

It has been found that molybdenum and chromium compounds such as the fluoride, chloride, bromide, iodide, sulfate, nitrate, phosphate, etc. as well as organic derivatives such as the carbonyl or acetylacetonate; and also organic acid salts such as the acetate, propionate, butyrate and other carboxylic acids having up to 12 carbon atoms such as the dodecanoate, are useful. The aforesaid salts and derivatives when added to the rhodium or iridium catalyst systems promoted with a halide, preferably iodide, provide catalyst systems which are stable against precipitation, decomposition and solid deposition under a wide variety of operating conditions; and in addition, exhibit high reactivity and long catalyst life.

In accordance with the present invention, ethylenically unsaturated compounds are preferably converted selectively to carboxylic acids by reaction in the liquid phase with carbon monoxide and water at temperatures from about 50°C to 300°C. preferably 125°C to 225°C and at partial pressures of carbon monoxide from 1 psia to 15,000 psia, preferably 5 psia to 3,000 psia in the presence of an improved catalyst system comprised of an iridium or rhodium containing compound, a promoter portion, i.e., a halide and the above molybdenum or chromium compound.

As referred to above, for the purpose of the present invention, the improved catalyst system as charged to the reactor contains essentially an iridium or rhodium component, a halide or halogen promoter, and the said compounds as stabilizers. The catalyst system essentially includes an iridium or rhodium compound or complex as the active component. This active catalytic portion or first component of the catalyst system is prepared from iridium or rhodium species such as the metals, simple iridium or rhodium salts, organoiridium or organohodium compounds, and coordination compounds of iridium and rhodium, examples of which are shown in the following partial list of suitable compounds.

Ir metal
Rh metal
$IrCl_3$
$RhCl_3$
$IrBr_3$
$RhBr_3$
$IrI_3$
$RhI_3$
$IrCl_3 \cdot 3H_2O$
$RhCl_3 \cdot 3H_2O$
$Ir_2(CO)_4Cl_2$
$Rh_2(CO)_4Cl_2$ Ir[(C₆H₅)₃P]₂(CO)I
Rh[(C₆H₅)₃P]₂(CO)Cl
[n-(C₄H₉)₄N][Ir(CO)₂X₂] where X = Cl⁻, Br⁻, I⁻
[n-(C₄H₉)₄N][Rh(CO)₂X₂] where X = Cl⁻, Br⁻, I⁻
IrBr[(C₆H₅)₃P]₃
RhBr[(C₆H₅)₃P]₃
IrO₂
Rh₂O₃

The term compound or corrdination complex used throughout this specification means a compound or complex formed by combination of one or more electronically rich molecules or atoms capable of independent existence with one or more electronically poor molecules or atoms, each of which may also be capable of independent existence.

The promoter essentially includes a halide or halogen component selected from the group consisting of chloride, bromide and iodide and may be provided by a hydrogen halide, alkyl halide having from one to 30 carbon atoms, free halogen, etc. Of this group bromide and iodide are preferred and iodide is especially preferred as the halide promoter. Although any ratio of promoter portion may be employed, ratios of promoter portion to active metal portion expressed as atoms of halogen promoter portion to atoms of iridium or rhodium in the active portion of the catalytic system in the range of 1:1 to 2,500:1 are generally employed. However, the preferred range is 3:1 to 300:1 halogen atoms per metal atom.

The improved catalyst systems of the present invention specifically make use of stabilizers to prevent precipitation. As employed herein, precipitation or solids deposition is defined as separation from the reaction system of crystalline or amorphous solid phases which contain the metal as such or as insoluble compounds of the metal.

Although any ratio of stabilizer portion may be employed, ratios of stabilizer portion to active portion expressed as molecules of stabilizer to atoms of metal in the a range of 0.1:1 to 1,00:1 are generally employed. However, the preferred range is 1:1 to 100:1 stabilizer molecules per metal atom (Ir or Rh):

The liquid reaction medium employed with the said improved catalyst system may be any solvent compatible with the improved catalyst system and may include pure olefins or saturated or unsaturated hydrocarbons, e.g., pentane, butylenes, benzene, decane, eiocosane, etc. Mixtures thereof with the desired carboxylic acid and/or other carboxylic acids such as nonanoic acid may be used. A preferred solvent component and liquid reaction medium for the process of this invention is a monocarboxylic acid having two to 20 carbon atoms, e.g., acetic, propionic, hexanoic, decanoic, dodecanoic, naphthoic, oleic, and elaidic acids, including isomeric forms. Water may optionally be added to the reaction mixture in excess of the stoichiometric quantity discussed below.

The present invention is based upon the production of carboxylic acids by the transformation of an ethylenically unsaturated compound, having two to 30 carbon atoms, and containing the structural unit

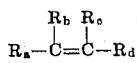

in heterocyclic, heteroaliphatic, aliphatic acyclic, cyclic or polycyclic hydrocarbon form, where $R_a$, $R_b$, $R_c$ and $R_d$ are moieties having from zero to 20 carbon atoms and being selected from the group consisting of hydrogen, halogen, alkyl, alkene, aryl, cycloalkyl and cycloalkene moieties. The said heterocompounds may also be substituted with nitrogen, phosphorus, sulfur, halogen, or oxygen atoms.

Suitable feedstock in the process of this invention are any ethylenically unsaturated compounds. Suitable compounds include ethylene, propylene, butene-1; butene-2; hexenes, octenes; dodecenes; hexadecene, 2-methylpropene; 1,3-butadiene; 2-methyl-1,3-butadiene; 2,3-dimethyl-1,3-butadiene; cyclohexene; methycyclohexene; styrene; methylstyrene; vinylcyclohexene; 3,3-dimethyl-1-butene; 1,4-hexadiene; 2,4-hexadiene; 1,5-hexadiene; 2-methyl-1,4-hexadiene; acrolein; methyl vinyl ketone; allyl alcohol; 2-phenylbutene; cyclopentadiene; 2-cyclohexylbutene; allene; allylamine; diallylamine; acrylonitrile; methyl acrylate; vinyl chloride; and mixtures thereof.

Other suitable feedstocks include compounds having cyclic and polycyclic structures containing, in part, an ethylenically unsaturated linkage which may be converted to a carboxylic acid by the process of this invention. Examples of suitable cyclic structures include 1,5-cyclooctadiene; 1,5,9-cyclododecatriene; furan; 1,2-dithiol and pyrrole. Preferred ethylenically unsaturated feedstocks include ethylene to produce propionic acid; olefins having from three to eight carbon atoms to produce carboxylic acids having from four to nine carbon atoms; and olefins having from nine to 19 carbon atoms to produce carboxylic acids having from 10 to 20 carbon atoms.

A typical carboxylation reaction selective to carboxylic acid requires at least one mole of carbon monoxide and one mole of water per mole (equivalent) of ethylenically unsaturated linkage reacted. An excess of carbon monoxide and water over the aforesaid stoichiometric amounts, however, may be present. Carbon monoxide streams containing inert impurities such as carbon dioxide, methane, nitrogen, noble gases and paraffinic hydrocarbons having from one to four carbon atoms, may be employed, if desired, for example from an available plant gas stream, with no ill effect; however, in such cases total reactor pressure may have to be increased to maintain a desired carbon monoxide partial pressure. The concentration of carbon monoxide in the feed gas mixture is from 1 vol percent to 99.9 vol percent, a preferred range being from 10 vol percent to 99.9 vol percent.

The reaction rate is dependent upon catalyst concentration and temperature. Concentrations of the metal compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on halogen atom. In the process of this invention, however, the preferred concentration range of promoter is $10^{-4}$ moles/liter to 2 moles/liter of catalyst solution.

The concentration of the third component or stabilizer portion of the catalyst system may vary widely over the broad range of $10^{-6}$ moles/liter to 18 moles/liter. However, the preferred concentration range of stabilizer is $10^{-4}$ moles/liter to 2 moles/liter of catalyst solution.

The active, stabilized, improved catalytic system is preferably supplied as a catalyst solution. The solution can also include liquid reactants, products and mixtures thereof which function as solvents or reaction media.

In the production of carboxylic acids, the ethylenically unsaturated feedstock is normally charged with equimolar amounts of water, although more water may optionally be used. The use of ethylenically unsaturated linkage compounds in the above ratios is on the basis that at least a molar quantity of water is present equivalent to the number of moles of ethylenically unsaturated linkage reacted.

The promoting portion or second component of the improved catalyst system as discussed herein consists of halide and may be supplied as the free halogen or halogen compound such as hydrogen halide, alkyl- or aryl-halide, metal halide, ammonium, phosphonium, arsonium, stibonium halide, etc., and may be the same or different from any halogen component already present in the precursor metal component of the catalyst system. Although any halide or halogen compound may be used, bromide and iodide are the preferred halogen component with iodide being especially preferred.

The above promoter portion or second component of the catalyst may alternatively be charged to the reactor separately from the active catalyst or first component, or it may be incorporated into the active component, e.g., $RhBr_3$, $[Rh(CO)_2I]_2$, $Ir(CO)_3I_3$ or $IrCl_3$.

The preparation of the improved, active catalyst system which includes (1) Ir or Rh metal or compounds thereof, (2) halide promoter and (3) stabilizer components may be accomplished by a variety of methods. For example, to prepare the catalyst system, the first component of the catalyst system, e.g., finely divided iridium or rhodium metal (powder), a simple compound or complex thereof, as a precursor is dissolved in a suitable medium, and carbon monoxide is bubbled through the above iridium or rhodium solution, preferably while maintaining gentle heating and stirring of the solution. Then an acidic solution of the desired promoter source is added to form an active catalytic solution. At this time, or before the carbon monoxide addition, the stabilizer component is added to the solution either dissolved in the same solvent or as a liquid or solid directly.

This catalyst solution containing the necessary metal or its compound, the promoter, and stabilizer components is then ready for use as discussed above, and may be employed as a liquid phase or vapor phase catalyst.

As another embodiment of the invention, carboxylic acids may be produced if desired via reaction of ethylenically unsaturated compounds with carbon monoxide and water in the vapor phase over the improved stabilized iridium containing catalyst systems described above, dispersed upon inert supports. Such a catalyst system may be operated as a conventional fixed bed catalytic reactor. For example, ethylene, aqueous hydrogen iodide, and carbon monoxide may be passed over a catalyst system consisting, for example, of $[Ir(CO)_2Cl]_2$ and a molybdenum or chromium stabilizer such as molybdenum bromide or chromium dodecanoate dispersed on an inert support material such as alundum, activated carbon, clays, alumina, silica-alumina, and ceramics, etc., in a fixed bed reactor maintained at elevated temperature and pressure, as described above, to produce propionic acid in high yields. However, use of a liquid reaction medium is preferred in the process of this invention using dissolved or dispersed active catalytic promoter and stabilizer components.

The ultimate nature of the catalyst as modified by reaction conditions, and the presence of promoters, stabilizers, and reactants has not been completely elucidated. However, it has been found that the use of the components described herein provides a highly superior catalyst and process for the production of carboxylic acids.

The three component catalyst system of the present invention is characterized by a high degree of stability combined with a very high reactivity, a combination which has not been achieved with any catalyst system described in the prior art for production of carboxylic acids. The catalyst systems described herein are stable and maintain high reactivity even under high vacuum conditions whereas the systems described in the prior art are susceptible to catalyst precipitation under such conditions which result in a much reduced catalyst life and overall reactivity.

As an example of the improved reactivity achieved by the present three component catalyst system it is found that the carboxylation of ethylene to propionic acid can be conducted at about 100 times as great a productivity per gram of noble metal using the combination catalyst of:
iridium chloride
hydrogen iodide
molybdenum chloride
relative to the equivalent formulation without the molybdenum chloride.

It has been found that when the previously known iridium and rhodium catalysts were used as homogeneous catalysts the metals can be precipitated as insoluble compounds when the reaction products are subjected to separation procedures such as distillation at elevated temperatures. This difficulty has been found to be particularly acute with carbonyl complexes which are subject to the loss of the carbon monoxide ligand, and resultant precipitation of noble metal in the form of the metal per se, as halides or as other insoluble compound forms. The problem of precipitation of the metal catalyst is further accentuated when a distillation is conducted under vacuum conditions, as is essential for instance in the separation of higher carboxylic acids, e.g., those having from eight to 30 carbon atoms from the liquid catalytic mixture.

It has also been found that the employment of the above specific molybdenum or chromium compounds as stabilizers in the catalyst solutions of iridium or rhodium components makes it possible to overcome the difficulties of precipitation such as have been encountered heretofore. The use of a precipitation inhibiting proportion of the aforesaid stabilizer, e.g., a combination of 0.01 mole/liter of the stabilizer in the catalyst solution overcomes such precipitation difficulties.

In another embodiment it has also been found that the present Mo and Cr stabilizers provide distillation-stable catalyst combinations of the iridium or rhodium compounds or complexes together with a halogen. The catalyst combination may thus be recycled after the removal by distillation of the volatile products, e.g., carboxylic acids and unreacted olefin. It is noteworthy that the present stabilizers do not deleteriously affect the carboxylation reaction in which olefin is reacted with carbon monoxide to obtain acids and/or esters.

For a better understanding of the process of the present invention specific embodiments of the invention are presented below. These examples and illustrations are not to be construed in any way as limiting the scope of the invention.

EXAMPLE 1

A batch reactor is charged with the following ingredients: 0.132 grams ($5 \times 10^{-4}$ moles) of an iridium compound having the formula $Ir_4(CO)_{12}$, as a catalyst precursor; 0.9 ml (0.005 moles) of a promoter consisting of 47 wt. percent aqueous hydriodic acid; 35 ml of tridecanoic acid as solvent; 4.7 ml of water as a reactant; and 50 ml (0.27 moles) of dodecene as feedstock. The charge also includes 0.22 grams ($1 \times 10^{-3}$ moles) of molybdenum acetate as a stabilizer.

The reactor is pressurized with carbon monoxide to a total pressure of 400 psig (partial pressure of CO about 350 psi) at 185°C. The reaction time is 3 ½ hours.

The reaction mixture when analyzed by gas chromatography yields a solution containing
 9.5 wt. percent unreacted dodecene
 0.6 wt. percent miscellaneous intermediates including iodides
 89.9 wt. percent tridecanoic acid No other organic oxygenated compounds such as alcohols, aldehydes, ketones, etc., are produced as determined by gas chromatographic analysis. No substantial amounts of other undesirable by-products such as methane, carbon dioxide, or higher carboxylic acids are formed.

In general, the proportion of the molybdenum or chromium compound employed as a stabilizer in the present invention is from 0.1:1 to 1,000:1 molecules of stabilizer per atom of metal in the active portion of the catalyst system.

Upon completion of the reaction, the product is subjected to distillation. The distillation is conducted under a pressure of 15 mm at which pressure the tridecanoic acids boil at approximately 185°C. The catalyst is stable under these conditions and no precipitation of any metal compound occurs. By contrast, when no molybdenum acetate is present as a stabilizer, it is found that a dark-brown solid containing iridium is precipitated during the distillation. In addition to the preventing precipitation, the stabilized catalyst system exhibits no deleterious effect on reactivity and product selectivity.

EXAMPLE 2

A batch reactor is charged with the following ingredients: 0.132 grams ($5 \times 10^{-4}$ moles) of an iridium compound having the formula $Ir_4(CO)_{12}$, as a catalyst precursor; 0.9 ml (0.005 moles) of a promoter consisting of 47 wt. percent aqueous hydriodic acid; 35 ml of tridecanoic acid as solvent; 4.7 ml of water as a reactant; and 50 ml (0.27 moles) of dodecene as feedstock. The charge also includes 0.26 gm ($1 \times 10^{-3}$ moles) of molybdenum carbonyl as a stabilizer.

The reactor is pressurized with carbon monoxide to a total pressure of 400 psig (partial pressure of CO about 350 psi) at 185°C. The reaction time is 3 ½ hours.

The reaction mixture when analyzed by gas chromatography yields a solution containing
 8.6 wt. percent unreacted dodecene
 0.6 wt. percent miscellaneous intermediates including iodides
 90.8 wt. percent tridecanoic acid Upon completion of the reaction, the product is subjected to distillation. The distillation is conducted under a pressure of 15 mm at which pressure the tridecanoic acids boil at approximately 185°C. The catalyst is stable under these conditions and no precipitation of any metal compound occurs. By contrast when no molybdenum carbonyl is present as a stabilizer, it is found that a dark-brown solid containing iridium is precipitated during the distillation.

EXAMPLE 3

A batch reactor is charged with the following ingredients: 0.132 grams ($5 \times 10^{-4}$ moles) of an iridium compound having the formula $Ir_4(CO)_{12}$, as a catalyst precursor; 0.9 ml (0.005 moles) of a promoter consisting of 47 wt. percent aqueous hydriodic acid; 35 ml of tridecanoic acid as solvent; 4.7 ml of water as a reactant; and 50 ml (0.27 moles) of dodecene as feedstock. The charge also includes 0.7 grams ($1 \times 10^{-3}$ moles) of chromium (II) acetate as a stabilizer.

The reactor is pressurized with carbon monoxide to a total pressure of 400 psig (partial pressure of CO about 350 psi) at 185°C. The reaction time is 3 ½ hours.

The reaction mixture when analyzed by gas chromatography yields a solution containing
 9.9 wt. percent unreacted dodecene
 0.6 wt. percent miscellaneous intermediates including iodides
 89.5 wt. percent tridecanoic acid No other organic oxygenated compounds such as alcohols, aldehydes, ketones, etc. are produced as determined by gas chromatographic analysis. No substantial amounts of other undesirable by-products such as methane, carbon dioxide, or higher carboxylic acids are formed.

Upon completion of the reaction, the product is subjected to distillation. The distillation is conducted under a pressure of 15 mm at which pressure the tridecanoic acids boil at approximately 185°C. The catalyst is stable under these conditions and no precipitation of any metal compound occurs. By contrast when no chromium acetate is present as a stabilizer, if is found that a dark-brown solid containing iridium precipitates during the distillation. In another test, it is found that chromium chloride and molybdenum iodide have similar stabilizing effects.

In addition to preventing precipitation, the stabilized catalyst system exhibits no deleterious effects on reactivity and product selectivity.

EXAMPLE 4

A batch reactor is charged with the following ingredients: 0.132 grams ($5 \times 10^{-4}$ moles) of an iridium compound having the formula $Ir_4(CO)_{12}$, as a catalyst precursor; 0.9 ml (0.005 moles) of a promoter consisting of 47 wt. percent aqueous hydriodic acid; 35 ml of tridecanoic acid as solvent; 4.7 ml of water as a reactant; and 50 ml (0.27 moles) of dodecene as feedstock. The charge also includes 0.22 gm ($1 \times 10^{-3}$ moles) of chromium carbonyl as a stabilizer.

The reactor is pressurized with carbon monoxide to a total pressure of 400 psig (partial pressure of CO about 350 psi) at 185°C. The reaction time is 3 ½ hours.

The reaction mixture when analyzed by gas chromatography yields a solution containing 8.5 wt. percent unreacted dodecene 0.6 wt. percent miscellaneous intermediates including iodides 90.9 wt. percent tridecanoic acid Upon completion of the reaction, the product is subjected to distillation. The distillation is conducted under a pressure of 15 mm at which pressure the tridecanoic acids boil at approximately 185°C. The catalyst is stable under these conditions and no precipitation of any metal compound occurs. By contrast when no chromium carbonyl is present as a stabilizer, it is found that a dark brown solid containing iridium is precipitated during the distillation.

EXAMPLE 5

A batch reactor is charged with the following ingredients: 0.325 gm ($5 \times 10^{-4}$ moles) of an iridium compound having the formula $Rh[(C_6H_5)_3P]_2(CO)Cl$ as catalyst precursor; 3.0 ml (0.0275 moles) of a promoter consisting of 48 wt. percent aqueous hydrobromic acid; 70 ml of propionic acid as solvent and 10 ml of water as reactant. The ratio of Br/Rh is 55:1. The charge also includes 0.17 gm of ($1 \times 10^{-3}$ moles) chromium (II) acetate as a stabilizer.

The reactor is then pressurized with a 50/50 mixture of ethylene and carbon monoxide to a total pressure of 700 psig (partial pressure of CO about 300 psi) at 175°C. The reaction is carried out at constant pressure by feeding the $C_2H_4$/CO mixture upon demand from a high pressure reservoir. Reaction time is 3 ¼ hours.

The reaction mixture subsequently analyzed by gas chromatography yields a solution containing 1.1 wt. percent miscellaneous intermediates including bromides 98.9 wt. percent propionic acid.

Upon completion of the reaction, the product is subjected to distillation. The distillation is conducted at atmospheric pressure at which propionic acid boils at approximately 141°C. The catalyst is stable and no precipitation of any metal or metal compound occurs.

In another test, it is found that equivalent proportions of elemental iodine, and also methyl iodide as a representative alkyl iodide, give similar results.

What is claimed is:

1. In a process for production of saturated carboxylic acids wherein an ethylenically unsaturated hydrocarbon having 2 to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter in the proportion of 3:1 to 300:1 halogen atoms per atom of iridium or rhodium, and a molybdenum or chromium fluoride, chloride, bromide, iodide, sulfate, nitrate, phosphate, carbonyl, acetate, propionate, butyrate, dodecanoate or acetylacetonate compound as a stabilizer component.

2. In a process for production of saturated carboxylic acids wherein an ethylenically unsaturated hydrocarbon is reacted with carbon monoxide and water at a temperature of 50°C to 300°C and subsequently separating the product acid by distillation, the improvement which comprises contacting the said reactants with a three component catalyst system comprised of an iridium or rhodium compound, a halide promoter in the proportion of 3:1 to 300:1 halogen atoms per atom of iridium or rhodium, and a molybdenum or chromium fluoride, chloride, bromide, iodide, sulfate, nitrate, phosphate, carbonyl, acetate, propionate, butyrate, dodecanoate or acetylacetonate compound as a stabilizer component, and distilling the products and unreacted reactants from the said catalyst system.

3. Process as in claim 2 in which the distillation step is a vacuum distillation.

4. The process as in claim 1 in which the partial pressure of carbon monoxide is from 1 psia to 15,000 psia.

5. A process as in claim 1 in which the iridium component is provided by iridium carbonyl.

6. A process as in claim 1 in which the rhodium component is provided by rhodium bis(triphenylphosphine)carbonyl chloride.

7. A process as in claim 1 in which the promoter is provided by hydrogen iodide.

8. A process as in claim 1 in which the promoter is provided by an alkyl iodide.

9. A process as in claim 1 in which the promoter is provided by iodine.

10. A process as in claim 1 in which the stabilizing component is provided by molybdenum acetate.

11. A process as in coordination 1 in which the stabilizing component is provided by chromium acetate.

12. In a process for production of saturated carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter in the proportion of 3:1 to 300:1 halogen atoms per atom of iridium or rhodium, and molybdenum carbonyl as a stabilizer component.

13. In a process for production of saturated carboxylic acids wherein an ethylenically unsaturated hydrocarbon having two to 30 carbon atoms is reacted with carbon monoxide and water at a temperature of 50°C to 300°C, the improvement which comprises contacting the said reactants in the presence of a three component catalyst system comprised of an iridium or rhodium compound, a halide promoter in the proportion of 3:1 to 300:1 halogen atoms per atom of iridium or rhodium, and chromium carbonyl as a stabilizer component.

14. Process as in claim 1 in which the ethylenically unsaturated hydrocarbon is dodecene and the product is tridecanoic acid.

15. Process as in claim 1 in which the ethylenically unsaturated hydrocarbon is comprised of olefin having from three to eight carbon atoms and the product is comprised of saturated carboxylic acids having from four to nine carbon atoms.

16. Process as in claim 1 in which the ethylenically unsaturated hydrocarbon is comprised of olefins having from nine to 19 carbon atoms and the product comprises saturated carboxylic acids having from 10 to 20 carbon atoms.

* * * * *